United States Patent
Monteverde

(10) Patent No.: US 8,335,743 B2
(45) Date of Patent: Dec. 18, 2012

(54) DYNAMIC WEB-BASED CONTENT BROKERAGE AND REVENUE SYSTEM

(75) Inventor: Dante Monteverde, Barrington Hills, IL (US)

(73) Assignee: EMERGENCY 24, Inc., Chicago, IL (US)

(*) Notice: Subject to any disclaimer, the term of this patent is extended or adjusted under 35 U.S.C. 154(b) by 0 days.

(21) Appl. No.: 11/928,631

(22) Filed: Oct. 30, 2007

(65) Prior Publication Data
US 2009/0112749 A1   Apr. 30, 2009

(51) Int. Cl.
G06F 21/00   (2006.01)
G06Q 30/00   (2012.01)

(52) U.S. Cl. ....... 705/51; 705/26.1; 705/26.3; 705/26.4; 705/52; 705/54; 705/59; 705/902; 726/28; 726/29; 726/30; 726/7; 715/202; 715/753

(58) Field of Classification Search ........... 705/26.1, 705/26.3, 26.4, 51–52, 54, 59, 902; 726/28–30, 726/7; 715/202, 753
See application file for complete search history.

(56) References Cited

U.S. PATENT DOCUMENTS

| 6,564,225 | B1* | 5/2003 | Brogliatti et al. | 707/104.1 |
|---|---|---|---|---|
| 6,718,312 | B1* | 4/2004 | McAfee et al. | 705/37 |
| 7,085,732 | B2 | 8/2006 | Gould | |
| 7,877,689 | B2* | 1/2011 | Gilley | 715/723 |
| 2001/0014876 | A1* | 8/2001 | Miyashita | 705/37 |
| 2001/0020231 | A1* | 9/2001 | Perri et al. | 705/14 |
| 2001/0049648 | A1* | 12/2001 | Naylor et al. | 705/37 |
| 2003/0051237 | A1* | 3/2003 | Sako et al. | 725/31 |
| 2003/0088465 | A1* | 5/2003 | Monteverde | 705/14 |
| 2003/0120582 | A1* | 6/2003 | Segal et al. | 705/37 |
| 2003/0135460 | A1 | 7/2003 | Talegon | |
| 2003/0172012 | A1* | 9/2003 | Otsuka et al. | 705/32 |
| 2005/0027594 | A1 | 2/2005 | Yasnovsky et al. | |
| 2005/0251482 | A1* | 11/2005 | Stefik et al. | 705/51 |
| 2006/0004630 | A1* | 1/2006 | Criddle et al. | 705/14 |
| 2006/0015449 | A1* | 1/2006 | Underwood et al. | 705/37 |
| 2006/0116924 | A1 | 6/2006 | Angles et al. | |
| 2006/0122929 | A1* | 6/2006 | Schoen et al. | 705/37 |
| 2006/0129453 | A1 | 6/2006 | Gardner et al. | |
| 2006/0229993 | A1* | 10/2006 | Cole | 705/51 |

(Continued)

FOREIGN PATENT DOCUMENTS

WO    WO2008/004237 A2 *  1/2008

(Continued)

OTHER PUBLICATIONS

White, R. How Computers Work. 1999. Que Publishing. All pages.*

(Continued)

*Primary Examiner* — James A Reagan
*Assistant Examiner* — Calvin Cheung
(74) *Attorney, Agent, or Firm* — Seyfarth Shaw LLP

(57) ABSTRACT

Systems and methods are disclosed for brokering media content or segments created by media creators for use by licensees on a website or webpage of the licensees. The media creators upload their media to a hosting database via an account, and potential licensees bid for the right to be a licensee and to use the media on their webpage. The highest bidding licensee receives a permission authorizing the delivery and display of the media on their webpage, via the database recording the actual page views and deliveries for calculating a license fee to be paid to the host and to the media creators for use of the media thereon.

20 Claims, 3 Drawing Sheets

U.S. PATENT DOCUMENTS

| | | | |
|---|---|---|---|
| 2006/0242017 A1 | 10/2006 | Libes et al. | |
| 2006/0287916 A1 | 12/2006 | Starr et al. | |
| 2006/0294538 A1* | 12/2006 | Li et al. | 725/24 |
| 2007/0067493 A1* | 3/2007 | Issa | 709/246 |
| 2007/0100688 A1* | 5/2007 | Book | 705/14 |
| 2007/0100757 A1* | 5/2007 | Rhoads | 705/51 |
| 2007/0105353 A1* | 5/2007 | Tong et al. | 438/497 |
| 2007/0150353 A1* | 6/2007 | Krassner et al. | 705/14 |
| 2007/0156838 A1* | 7/2007 | Kocho et al. | 709/217 |
| 2008/0016229 A1* | 1/2008 | Lee | 709/229 |
| 2008/0071594 A1* | 3/2008 | Morin | 705/7 |
| 2008/0155588 A1* | 6/2008 | Roberts et al. | 725/34 |
| 2009/0099922 A1* | 4/2009 | Paradies | 705/14 |

FOREIGN PATENT DOCUMENTS

WO     WO2008/026830 A1 * 3/2008

OTHER PUBLICATIONS

"Viral Video", Wikipedia. Published Sep. 13, 2006. Retrieved via Wayback Machine. <http://web.archive.org/web/20060913000000/http://en.wikipedia.org/wiki/Viral_video>.*

"Viral Marketing", Wikipedia. Published Sep. 13, 2006. retrieved via Wayback Machine. <http://web.archive.org/web/20060913000000/http://en.wikipedia.org/wiki/Viral_marketing>.*

U.S. Appl. No. 60/949,795, filed Jul. 13, 2007.*

U.S. Appl. No. 60/965,902, filed Aug. 23, 2007.*

* cited by examiner

DYNAMIC WEB-BASED CONTENT BROKERAGE AND REVENUE SYSTEM

FIELD OF THE INVENTION

The invention relates to web-based media and, in particular, to a system facilitating bidding on, use of, and collection of revenue for web-based media.

BACKGROUND

The existence of a large portion of the Internet is dependent on collecting revenue from advertising. For example, many companies have leveraged search-engine platforms into creating a multi-billion dollar advertising market, fees being paid by advertisers in order to have advertisements displayed to users or for being a "sponsored" link displayed to the user very early in the search results.

Properly viewed, the Internet is an entirely unique medium or outlet, different from television, books, periodicals, newspapers, movie-house cinema, etc., and is a medium for which companies are competing at breakneck speed to understand better. For instance, while people have demonstrated a very high tolerance (in fact, a preference) for reading news content online, people do not have nearly the same tolerance for reading a lengthy book in electronic form. Many electronic devices exist for stripping commercials from television content (such as commercial skipping video cassette recorders (VCRs) and digital video recorders (DVRs)), while people will surf the Internet for hours and expose themselves to much more advertisement, relative to the time spent viewing content, through the simple fact of viewing web pages.

Internet-based companies are, accordingly, devising new and more effective manners for collecting revenue from ad placement. It is believed that one frontier for effectiveness in ad placement is viewer-targeted advertisement. To compare with traditional forms of advertisement-based media, newspaper advertisers have their advertisements placed in proximity to newspaper content that is relevant to the product or service being offered. For instance, a home developer may place advertisements for a new home development in the real estate section of the newspaper, while a movie theater would place a listing in the entertainment section. Advertising companies spend incredible amounts of money and effort developing demographic profiles of target audiences so that an advertisement placed during broadcast of a particular television program allows the advertisement to be shown to viewers who are likely to be interested in the product or services of the advertising company. Internet-based companies may come under attack from privacy groups because developing demographic profiles for the display of advertising often involves the unconsented-to collection of personal data for a user.

In traditional forms of media, a large capital investment needs to be made in order to create advertising. A marketing company will consider a product or service (such as a luxury automobile), perform marketing research to identify characteristics of a target audience or user (people with the income or means to purchase luxury automobiles, as well as being decision-makers for large household expenses), and perform marketing research to determine what media segment is particularly relevant for that target audience (such as a televised golf sporting event that tends to attract viewers with these characteristics). Once this is done, the advertising content must be developed to effectively demonstrate the product or service in a manner that is appealing to the viewer. At each stage, many people are involved in the decision making process, and the entire advertising campaign is launched with little idea of the ability of the campaign to result in sales justifying the expenditure. As a result, the campaign tends to lose any particular panache or edge as a final result.

The Internet is capable of lowering many of the cost barriers of advertisement production. In order to display or remove an advertisement, a website administrator simply needs to change a few lines of code, or remove the advertisement from being active for display from a database. However, heretofore, there has been little access for creative-type individuals with minimal resources to gain access and exposure on the Internet.

It is clear from the development and desirability of so-called "viral videos" that many people are capable of creating content that web surfers will actively seek to view and will forward links for watching the videos to friends and acquaintances. This is evident from the popularity of sites such as YouTube. These videos are cheap as they are often freely uploaded to Internet-video websites in the hope, on the part of creators, to gain exposure. As a business model, companies have explored manners of capturing the viewing audiences to produce revenue from advertisements associated with the page views.

As an example of revenue-generation from Internet-accessible videos, U.S. Patent Publication No. 2006/0287916, to Starr, et al., describes a "web-based marketplace where self-publishing media creators meet advertisers in order to associate advertisements with media segments" produced by the creators. In other words, advertisers are able to deal, through the marketplace, with the producers of videos. As many videos are available, an advertiser is able to select from the videos instead of developing a marketing strategy and hiring companies to produce advertisements tailored for their purposes. The marketplace is designed to provide revenue to the creator, the revenue seemingly based on a pay-per-view basis, and the marketplace includes a bidding platform for the right to the media segment for the advertising purpose.

However, the focus of the Starr, et al., application is akin to traditional television advertisement. In television, two types of advertising are commonly used: the best-known form of advertising is the traditional two-minute break in the programming for an advertisement from the program's sponsors, and a less utilized form of advertising is the use of an advertising placed immediately over the programming content such as a company's logo running along the bottom of the television screen. The Starr, et al., application does the same whereby an advertiser bids on the right to place their commercial within or atop the video.

In fact, the Starr, et al., application has many features in common with U.S. Pat. No. 7,085,732, to Gould, which discloses a bidding system for advertising. The bidding system is used for auctioning the right to place advertisements in "printed publications, billboards, radio, television, videos, network portals, web pages, and the like." Both the Starr, et al., publication and the Gould patent are focused on advertisers bidding on the right to place their own advertisement with or within, as an adjunct, a particular media segment or video, for instance.

The concept of "stock" photography is well-known and has been applied to web-based applications. Stock photography is, in short, a plurality of photos that are produced speculatively by a photographer and then offered for use by others for a license fee. Many companies exist as stock photography brokers and offer the works of a number of photographers for traditional marketing companies to review and select for campaigns. This allows the marketing companies to select what strikes them as being what they desire without having to specifically commission someone to translate their concepts into photography. This allows the creative-type individuals to create images according to their whim and possibly generate revenue from this photography, and the marketers and advertisers can get works that serve their purposes, often with greater inherent creativity and of a substantially decreased price as compared to a commissioned photographer specifically hired by the advertiser. Moreover, websites have been developed for hosting stock photography images, as well as some websites have been developed that do the same with stock video segments.

Web-based stock hosting services have, however, maintained a traditional brick-and-mortar business model. That is, the fees paid for use of the media content from these services rely on flat-fee license agreements focused on the use and duration of the media content, and on the transfer of the files for the image or video to the licensee. These services are not able to provide competitive bidding for the use of the media content, and are not able to track the use of the image or video. Furthermore, these services are not able to prevent the unauthorized transfer of the media content, and these services would not be able to ensure that only one licensee is using the media content at any particular time.

Accordingly, there is a need for an improved method and system for facilitating access to Internet-based media content for advertisement and for generating revenue from the use of the media content.

SUMMARY

In accordance with an aspect, a system for brokering electronic-format media is disclosed including a display module for delivering and displaying the media to one or more potential licensees, an access system permitting potential licensees to review the media, a transaction system allowing the potential licensees to make a bid or offer (such as a monetary bid) for the right to use the media, wherein a potential licensee making the highest bid or offer is awarded the right to be a licensee with the right to use the media, and a permission enabling the licensee to have the media displayed on a website of the licensee.

In some forms, the system includes a hosted database, wherein creators of media content or segment upload the media content to the database for display by the display module. In some forms, a transaction system provides a bidding platform for potential licensees to bid against each other for the right to use the media content. The bidding platform may be auction-based for the bidding.

In some forms, the system includes security features for displaying the media content. The security features may include, for example, an access system for enabling the potential licensees to review the media content before bidding. The security features may also include an access account and password for the potential licensees to review the media content. The security features may include electronic watermarking of the displayed media content for authentication and tracking.

In some forms, the system includes a search engine for enabling potential licensees to search for media content. In some forms, the licensee makes payment for use of the media based on the highest offer or bid and based on an actual number of views of the media content by Internet users. The creator may be compensated based on the bid payment from the licensee. For example, if a business were to bid $1.00, each instance an Internet user views the media content, the business would pay $1.00, all of or a portion of which may be payable to the content creator.

In a further aspect, a method of brokering electronic media for website usage is disclosed including the steps of providing one or more databases, storing electronic media on the databases, providing a system for accessing the databases by potential licensees, enabling review of the media on the databases by the potential licensees, hosting a bidding process for the right to use the media by the potential licensees, awarding a highest bidder of the potential licensees the right to use the media and designating the highest bidder as a licensee, and enabling display of the media on a website of the licensee.

In some forms, the step of providing a system includes providing an access system, and providing an account and an account login for each potential licensee for accessing the access system. In some forms, the step of enabling review of the media on the databases includes inhibiting the use of the media content during review thereof. In some forms, the step of hosting a bidding process includes providing an auction to determine the highest bidder.

In some forms, the step of enabling display of the media on a website of the licensee includes providing a permission to the licensee for the media, and when a webpage of the website is requested by an Internet user, utilizing the permission to have the media delivered from the databases and displayed on the webpage. The step of enabling display of the media on a website of the licensee may further include, when the webpage of the website is requested, the permission transmitting a request for the media, and authenticating the access right of the permission and the licensee for delivery and display of the media on the webpage.

In some forms, the method includes a step of enabling creators of media to upload media to the databases. The method may further include a step of providing creators with accounts for uploading media to the databases, and for receiving payment for use of the media by licensees. The method may further include a step of restricting use of the media to a single licensee at any particular time.

In some forms, the method includes utilizing the media as an advertisement on the website of the licensee.

Accordingly, the systems and methods provide benefits to advertisers that are able to utilize cost-effectively media content (that is, lower costs) of a great variety, and content creators are able to gain exposure for their works and are paid (by the highest bidder) according to the use of their works while still retaining control over the works and media content.

DETAILED DESCRIPTION

Referring to the Figures, systems and methods for web-based hosting and brokerage of media content are disclosed.

Figure 1:
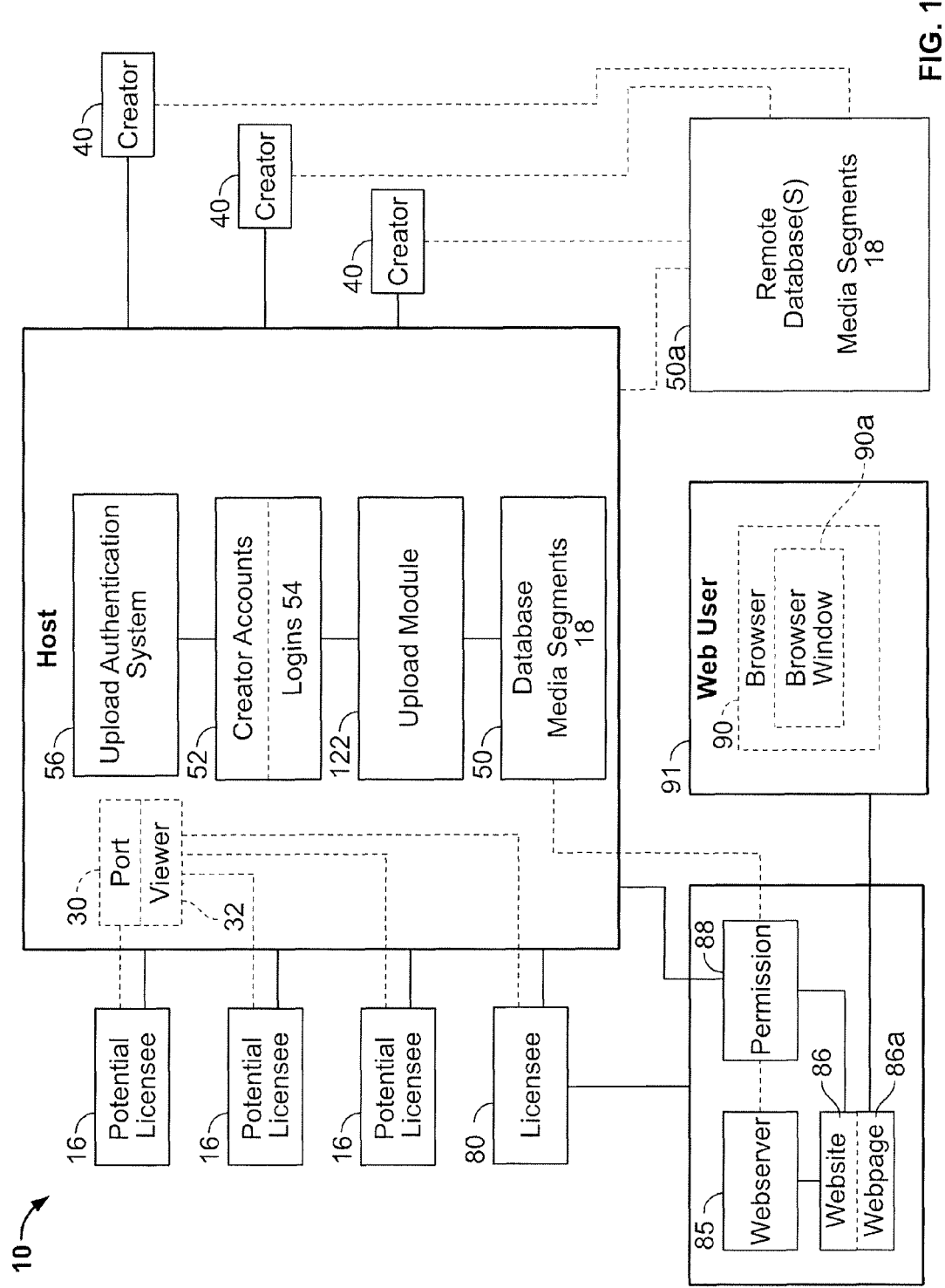
FIG. 1 is a representational view of a system for receiving media created by media creators, for permitting potential licensees to bid on the right to use the media hosted thereon, and for delivering and displaying the media on a webpage or website of a licensee.
Figure 2:
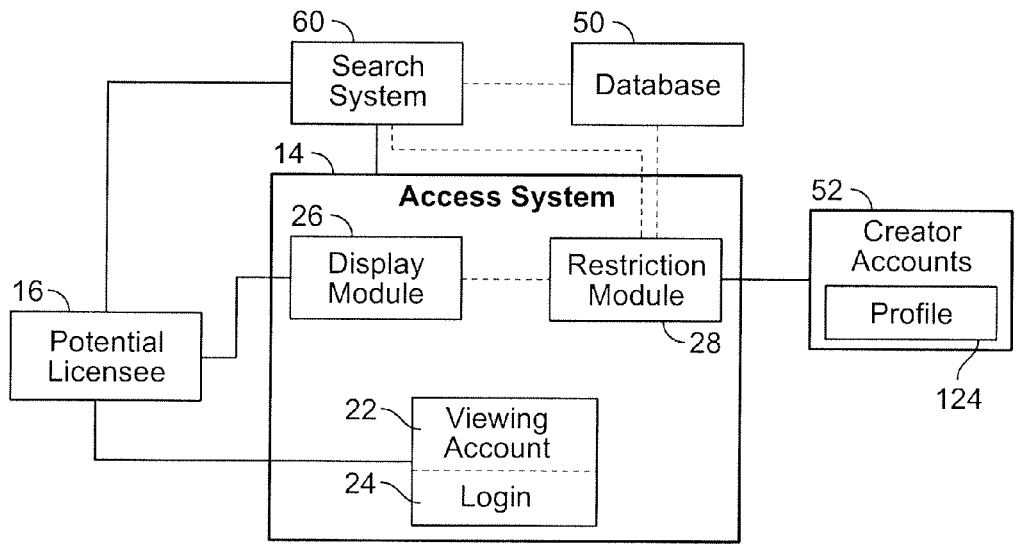
FIG. 2 is a representational view of a portion of the system for displaying the media hosted on a database of the system to potential licensees.
Figure 3:
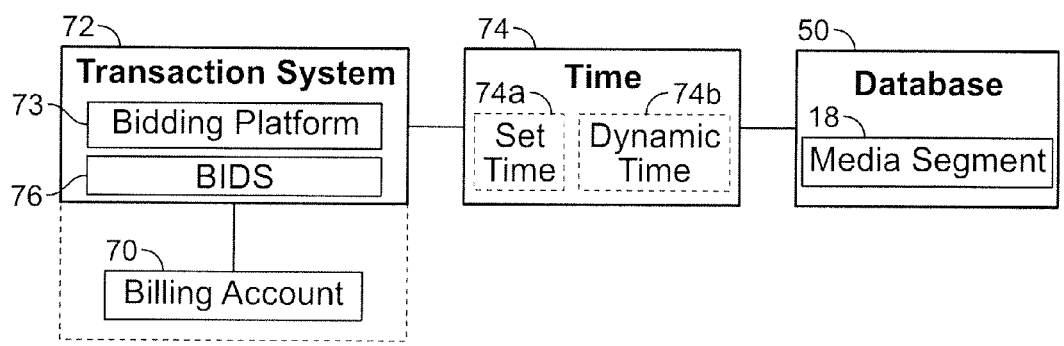
FIG. 3 is a representational view of a portion of the system for enabling offers and bids for the right to use the media.
Figure 4:
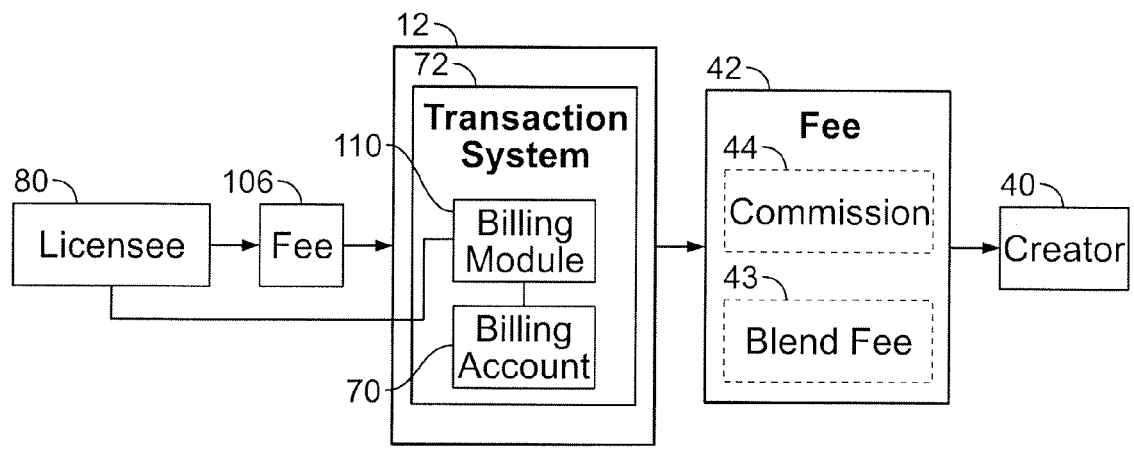
FIG. 4 is a representational view of a portion of the system for receiving payment from a licensee for use of the media and for making payment to creators for use of the media.
Figure 5:
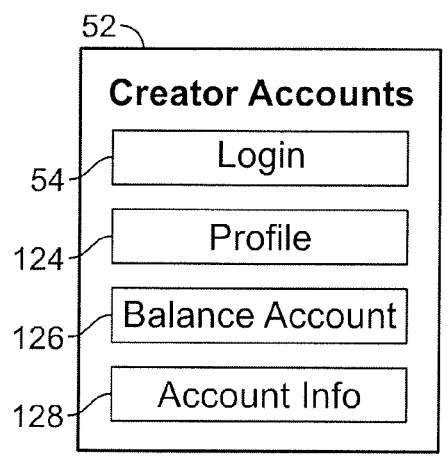
FIG. 5 is a representational view of an account of a creator of the media.

As shown in FIG. 1, a system 10 is shown including a host 12 having a viewing access system 14 allowing potential licensees 16 to review media segments 18. In a preferred form, the potential licensees 16 are advertising entities that are interested in using the media segments 18 in exchange for fees or compensation, such as to support an advertisement campaign. It should be noted that the media segments 18 are preferably video segments, but may be any type of electronic format content including photo images, graphic images, audio clips, banners, web pages or templates, web frames, scripts, or combinations thereof.

In a preferred form, the viewing access system 14 is a web-based system allowing the potential licensees 16 to access the media segments 18 for viewing over the Internet, and in a more preferred form includes a security measure. In forms of the system 10, the host 12 includes a viewing authentication/identification system 20 so that the potential licensees 16 may access the media segments 18 for review before bidding on the right to display the media segments 18 under the terms of an agreement specifically limiting the right to view the media segments 18, without permitting the potential licensees 16 to store or otherwise download the media segments 18 unless the right to do so has been awarded to the potential licensee 16, as discussed herein. This enables the host 12 to prevent or limit unauthorized use of the media segments 18.

The viewing authentication/identification system 20 may require a viewing account 22 and a viewing login 24 for the potential licensees 16 to access the media segments 18. The viewing access system 14 includes a display module 26 for delivering and/or displaying the media segments 18 to the potential licensee 16, such as via an Internet connection.

A variety of features may be used to discourage or inhibit unauthorized use of the media segments 18. For instance, the media segments 18 may be electronically watermarked for exclusive viewing by the potential licensees 16. Alternatively, the host 12 may include a dedicated port 30 and/or a viewer 32 that prohibits certain activities by the potential licensee 16.

The media segments 18 may be provided by creators 40 for display and offer for use by the host 12, which serves as a broker and intermediary between the potential licensees 16 and creators 40. The business relationship between the creators 40 and the host 12 may be in a variety of constructions including an employee-employer relationship in which the creators 40 are hired specifically to create media segments 18 or content therefor, or as a consignment or other at-arms-length relationship in which the creators 40 independently create the media segments 18 (or content therefor). In a typical at-arms-length relationship, the creators 40 create the media segments 18 in an independent speculative manner. The host 12 receives compensation, which may be in the form of a commission based on the use of the media segment 18 by a licensee 80 (discussed below), which may simply be a listing fee 42 charged to the creator 40 for the service, or for a blend 43 of a service fee 42 and a commission 44.

The media segments 18 are electronically stored. In a preferred form, the host 12 includes a storage database system 50 for storing the media segments 18 available for viewing by the potential licensees 16. Alternatively or in addition, the host 12 may simply access a plurality of remotely or separately databases 50a administered or controlled by others, such as intermediary brokers or possibly the creators 40 themselves. In the preferred form, the creators 40 upload media segments 18 to the database system 50 and, thus, have a creator account 52 for doing so (including a login 54 and an upload authentication system 56).

The viewing access system 14 preferably includes a search system 60. The potential licensees 16 utilize the search system 60 so that media segments 18 may be reviewed that are relevant to that which the potential licensees 16 are seeking. Media segments 18 may be categorized or associated with keywords for the search functionality in well-known ways.

In order to gain the right to use the media segments 18, the potential licensees 16 must have a billing account 70, which may or may not be established or opened coincident with the establishment of the viewing account 22. The host 12 includes a transaction system 72, preferably a bidding platform 73 or auction system that receives bids from the potential licensee 16 for use of a particular media segment 18. It should be noted that a particular creator 40 may restrict the usage of their media segments 18 in certain limited manners or certain types of potential licensees 16; for instance, a creator 40 may blacklist potential licensees 16 that may not use the media segment 18, such as companies that are engaged in business which the creator 40 opposes (i.e., doing business with certain business endeavors). Any restrictions on the usage established by the creator 40 may be implemented by the viewing access system 14 in the form of a restriction module 28.

The transaction system 72 specifies a time 74 by which bids 76 for use of the media segment 18 must be received. The time 74 may be a set time 74a, as is common in web-auctioning, or may be a dynamic time 74b that prevents so-called "slamming" where bids 76 are received immediately prior to the time 74. For instance, the dynamic time 74b may prescribe that the time 74 remains open for a stated period, such as a business day, following any new high bid so that bidding remains open until bidding effectively ceases when no additional higher bids are being received, in the manner of a traditional brick-and-mortar auction house. It should be noted that, alternatively, the bidding for the use of the media segment 18 may simply be akin to, for instance, purchasing an automobile where the host 12 and/or creator 40 awaits what is considered a sufficient pre-determined bid amount (based on the bid amount 76 and the number of expected views which determine a pay-per-view revenue stream), and the right to use the media segment 18 is awarded immediately once a potential licensee 16 bids this sufficient bid amount.

Having "won" the auction or bidding for the right to use a media segment 18 with the highest bid amount, the potential licensee 16 becomes an actual licensee 80, and the media segment 18 is no longer available for bidding or use by other potential licensees 16. That is, only one entity (the licensee 80) may use the media segment 18 at any particular time. Should the licensee 80 fail to make or ceases making payments, run out of money, or otherwise discontinue use of the media segment 18, the host 12 may revoke the right to use the media segment 18, which again becomes available for use by other potential licensees 16. In one form, the next highest bidder from the original auction may be offered the right to use the media segment 18, while in another form a new auction or offering may be held.

In a preferred form, the media segments 18 are generic. An exemplary media segment 18 may depict a child sitting on a picnic table enjoying ice cream on a warm sunny day. Such a media segment 18 may then be considered for use by entities (potential licensees 16) that would like to use the video to advertise a variety of products and services including, for instance, ice cream, picnic tables, vacation spots having picnic tables, or even allergy medicine companies. In this manner, somewhat akin to stock photography, the media segment 18 becomes the desired content for the licensee 80. This is in contrast to a viral video, for instance, that web surfers desire to watch of its own accord whereby an advertisement is placed on or within the video in an invasive or intrusive manner.

Nonetheless, many forms of electronic media segments 18 may be personally tailored for a specific licensee 80. For instance, a graphic image or banner may be altered to include the logo or name of the licensee 80. In any event, it is preferred that the system 10 and the host 12 do not disclose the creator 40 or the source of the media segment 18 so that the host 12 may not be circumvented by the licensee 80 (or other potential licensees 16) directly contacting the creator 40.

Once the bidding has concluded, the media segments 18 are provided for the use of the licensee 80. While the media segments 18 may be transferred to the licensee 80 for hosting on a separate system selected or designated by the licensee 80, doing so would leave the host 12 and the creator 40 more susceptible to misappropriation or unauthorized of the media segment 18 because control of the media segment 18 would be lost. Ideally, the media segments 18 remain solely in the database 50 and are not transferred to the control of the licensee 80.

To allow the media segment 18 hosted by the database 50 to be viewed on a website 86 of the licensee 80, the licensee 80 receives a permission 88 (such as a javascript, for instance) for placing within their webpage(s) 86a. When the webpage 86a is viewed, the permission 88 transmits a request for the media segment 18 from the database 50, which in turn authenticates the request of the permission 88 and delivers the media segment 18 for viewing by an internet user 91. Preferably, the database 50 delivers the media segment 18 directly to the webpage 86a (more specifically, to a frame or window 90a of a browser 90 of a web user 91 who requested the webpage 86a). Because many web browsers 90 have security restrictions that may be activated so that the browser 90 forbids downloading files from a host server with a different address (URL, DNS entry, etc.), the permission 88 may reside on the licensee's web server 85, and the media segment 18 is delivered to the webpage 86a through the web server 85. Formatting and displaying parameters for displaying the media segment 18 in the window 90a may be specified in the coding of the webpage 86a.

As described, the system 10 provides for license fees 100 on a pay-per-view basis so that the licensee 80 pays for using the media segment 18 each time the media segment 18 is viewed by an internet or web user 91. The host 12 controls the media segment 18 in the database 50, and the media segment 18 is sent to the licensee 80 or licensee's web site 86 each time the media segment 18 is requested to be displayed by a web user 91. Accordingly, the host 12 includes a billing module 110 for recording the fees 100 due based on the bid amount 76. The billing module 110 may invoice the licensee 80 in a traditional manner, with or without a detailed printout of recorded use (such as a web log showing date, time, and IP address of a web user), may debit the billing account 70 of the licensee 80, or may utilize some other billing mechanism.

The creators 40 may each have separate accounts 52 enabling all necessary interaction between the host 12 and the creator 40. The host 12 includes an upload module 122 tied to the creator account 52 allowing the media segments 18 to be sent to the database 50 and tagged or otherwise appended so that the ownership interest of the creator 40 in the media segments 18 is noted and identified. The restriction module 40 may access a profile 124 or preferences in the account 52 for determining any restrictions on use of the media segments 18. The creator account 52 also includes either a balance account 126 into which payments may be deposited for use of the creators' media segments 18 based upon the bid amount 76, or account information 128 so that payment monies may be forwarded to another account or directly to the creator 40 (i.e., a check drawable on an account of the host).

In accordance with the above, the system 10 is used by licensees/potential licensees to search for content in the form of media segments 18 for use on their web site 86 such as for advertising purposes. The creators 40 provide unsolicited original work in the form of the media segments 18. The system 10 brings the creators 40 and licensees/potential licensees together to broker an arrangement that serves the purpose of each. For instance, the potential licensees 16 are able to view many different media segments 18 to consider their own needs, and the relative costs thereof, without making a substantial capital investment. The licensees 80 are able to easily use (and discontinue the use of) media segments 18 with a lower overhead and greater certainty as to cost for the finished product, are the licensees 80 are easily able to implement usage of the media segment 18 on their website, for instance. For creators 40, the use of the system 10 allows equal footing to established media segment or content creators, and allows for access to potential licensees/licensees. The system 10 allows access thereto by the creator 40 and the potential licensees/licensees, and provides accounts for each so that potential licensees 16 can bid on using the media segments 18, the licensee 80 can pay for the use of the media segments 18, and the creator 40 can upload the media segments 18 and receive payment for their use. The system 10 is designed to host the media segments 18 and deliver the media segments 18 when requested to the web page 86 so that use of the media segment 18 is based on a pay-per-view basis according to the licensee's winning bid amount 76.

While previous known systems provided for stock content, the present system 10 is able to control the use of the content (media segments 18) on a pay-per-view basis instead of a flat-fee and uncontrolled basis. The present system 10 is able to terminate the use by the licensee 80 of the media segment 18, while stock content providers are unable to do so. Additionally, the present system 10 leverages bidding and auction methods for the right to use the media segments 18 with the ability to bring potential licensees 16 and creators 40 together. Though it is known to bid on the right to place advertising within media content, the present system 10 allows for the media segments to be placed within the web page 86 or on line materials such as advertising materials of the licensee: in other words, while previous systems allowed a winning bidder to place their advertising material into media content, the present system 10 allows the winning licensee 80 to utilize the media segment 18 as the advertisement, making the media segment an integral part of the advertisement.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An advertisement system for brokering electronic-formatted media provided by a third-party creator, the system comprising:

a database adapted to receive an advertisement from an entity and the electronic-formatted media from the third-party creator;

an access system adapted to cooperate with the database and permit the entity to review the electronic-formatted media;

a restriction system adapted to determine whether the entity is a restricted entity prevented from obtaining a right to use the electronic-formatted media; and a transaction system
for allowing the entity to bid for the right to use the electronic-formatted media,
for granting the right to use the electronic-formatted media to the highest bid entity, and
for restricting the right to use the electronic-formatted media to the restricted entity even when the restricted entity is the highest bid entity.

2. The advertisement system of claim 1 wherein the transaction system provides a bidding platform for the entity to bid for the right to use the electronic-formatted media.

3. The advertisement system of claim 2 wherein the bidding platform provides an auction for the bidding.

4. The advertisement system of claim 1 further comprising a security feature adapted to display the electronic-formatted media.

5. The advertisement system of claim 4 wherein the security feature includes an access system adapted to enable the entity to review the electronic-formatted media.

6. The advertisement system of claim 5 wherein the security feature includes:
an access account; and
a password for the entity to review the electronic-formatted media.

7. The advertisement system of claim 4 wherein the security feature includes an electronic watermark disposed on the electronic-formatted media.

8. The advertisement system of claim 1 further comprising a search engine adapted to enable the entity to search for electronic-formatted media.

9. The advertisement system of claim 1 wherein the third-party creator is compensated based on a payment from the highest bid entity.

10. An advertisement method of brokering electronic-formatted media provided by a third-party creator for usage on a website comprising the steps of:
providing a database;
receiving, by the database, the electronic-formatted media;
receiving, by the database, an advertisement;
providing a system for accessing the database by an entity;
enabling review via a web server of the electronic-formatted media for use in combination with the advertisement by the entity;
determining whether the entity is a restricted entity prevented from being granted a right to use the electronic-formatted media;
hosting a bidding process for determining the right to use the electronic-formatted media by the entity;
defining the entity with a highest bid as a highest bid entity;
granting the right to use the electronic-formatted media to the highest bid entity;
restricting the right to use the electronic-formatted media to the restricted entity even when the restricted entity is the highest bid entity; and
allowing the highest bid entity to combine the advertisement with the electronic-formatted media.

11. The advertisement method of claim 10 wherein the step of providing a system includes:
providing an access system; and
providing an account and an account login for the entity for accessing the access system.

12. The advertisement method of claim 10 wherein the step of enabling review of the electronic-formatted media on the database includes inhibiting the use of the electronic-formatted media content during a review thereof.

13. The advertisement method of claim 10 wherein the step of hosting a bidding process includes providing an auction to determine the highest bid entity.

14. The advertisement method of claim 10 wherein the step of allowing the highest bid entity to combine the advertisement with the electronic-formatted media includes:
providing a permission to the highest bid entity;
utilizing the permission to have the electronic-formatted media delivered from the database when a webpage of the website is requested; and
displaying the electronic-formatted media on the webpage.

15. The advertisement method of claim 14 wherein the step of enabling display of the electronic-formatted media on a website of the highest bid entity further includes:
transmitting a request for the electronic-formatted media when the webpage of the website is requested;
authenticating the permission and the highest bid entity; and
displaying the electronic-formatted media on the webpage.

16. The advertisement method of claim 10 further comprising a step of enabling the third-party creator to upload the electronic-formatted media to the database.

17. The advertisement method of claim 16 further comprising providing the third-party creator with an account for uploading the electronic-formatted media to the database, and for receiving a payment for use of the electronic-formatted media by the highest bid entity.

18. The advertisement method of claim 10, further comprising:
restricting use of the electronic-formatted media to the highest bid entity thereby granting an exclusive license to use the electronic-formatted media to the highest bid entity.

19. The advertisement method of claim 10 including utilizing the electronic-formatted media with an advertisement on the website of the highest bid entity.

20. An advertisement method of brokering electronic-formatted media provided by a third-party creator for use on a website of an entity comprising the steps of:
providing a database;
storing electronic-formatted media on the database;
storing an advertisement on the database;
providing a system for accessing the database by the entity;
enabling review via a web server of the electronic-formatted media for use in combination with the advertisement;
determining whether the entity is a restricted entity prevented from obtaining a right to use the electronic-formatted media;
hosting a bidding process for the right to use the electronic-formatted media;
defining the entity with a highest bid as a highest bid entity;
granting the highest bid entity the right to use the electronic-formatted media;
restricting the right to use the electronic-formatted media to the restricted entity even when the restricted entity is the highest bid entity; and
enabling combination of the advertisement and the electronic-formatted media on the website of the highest bid entity including:
providing a permission to the highest bid entity;
utilizing the permission to have the electronic-formatted media delivered from the database when a webpage of the website is requested;
displaying the electronic-formatted media on the webpage; and
compensating the third-party creator of the electronic-formatted media at least a portion of the highest bid.

* * * * *